United States Patent [19]

Hartle et al.

[11] Patent Number: 5,226,580
[45] Date of Patent: Jul. 13, 1993

[54] AUTOMATED HEAT PIPE PROCESSING SYSTEM

[75] Inventors: Robert T. Hartle, Cupertino; Rodney McGann, Soquel; Richard A. Thomas, Sunnyvale, all of Calif.

[73] Assignee: The United States of America as represented by the Secretary of the Air Force, Washington, D.C.

[21] Appl. No.: 858,381

[22] Filed: Mar. 25, 1992

[51] Int. Cl.$^5$ .............................. B23K 20/12
[52] U.S. Cl. ..................... 228/113; 228/205; 228/2; 29/890.032
[58] Field of Search ............... 228/112, 113, 205, 221, 228/2; 29/890.032

[56] References Cited

U.S. PATENT DOCUMENTS

| | | | |
|---|---|---|---|
| 4,106,171 | 8/1978 | Basiulis | 29/157.3 R |
| 4,109,709 | 8/1978 | Honda et al. | 165/105 |
| 4,228,944 | 10/1980 | Inamura et al. | 228/198 |
| 4,450,798 | 5/1984 | Jessel | 123/41.41 |
| 4,557,413 | 12/1985 | Lewis et al. | 228/183 |
| 4,688,311 | 8/1987 | Saperstein et al. | 29/157.3 R |
| 4,760,238 | 7/1988 | Sanderson | 219/121.13 |
| 4,777,561 | 10/1988 | Murphy et al. | 165/80.4 |
| 4,852,791 | 8/1989 | Otsuka et al. | 228/183 |
| 4,911,351 | 3/1990 | Ishikawa et al. | 228/183 |

Primary Examiner—Samuel M. Heinrich
Attorney, Agent, or Firm—Stanton E. Collier; Donald J. Singer

[57] ABSTRACT

An automated heat pipe processing system is able to take a heat pipe casing and an end cap for the heat pipe casing and form these into a heat pipe within a totally contained system. The heat pipe casing and end cap are cleaned by means of glow-discharge plasma, a bakeout heating, if required. After cleaning, a working fluid is placed within the cleaned heat pipe after which the end cap is fixedly attached to the heat pipe casing by means of inertia welding. This in-situ fabrication of the heat pipe minimizes defective end products and steps to fabricate such.

15 Claims, 7 Drawing Sheets

⊤ WITNESS  • INSPECTION

⊗ → VALVE
TC → THERMOCOUPLE
ℓ → LIQUID
g → GAS

AUTOMATED HEAT PIPE PROCESSING SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention relates to heat pipes, and, in particular, to automated heat pipe processing and the apparatus for such.

The prior heat pipe fabrication process relied upon a series of steps requiring packaging and repackaging between individual work stations and numerous inspections thereat. Following solvent cleaning, the heat pipe casing is assembled with transition joint fill tubes and temporary valves via manual tungsten inert gas (T.I.G.) welding. Manual fusion welding is the primary means of assembly to provide leak tight, pressure vessel soundness. This process alone accounts for up to 85% of in-processing failures, commonly requiring scrappage of the completed unit. In a series of high risk procedures, additional costs are incurred to prevent continued processing of defective hardware. As a result, 70% of the total fabrication cost has been expended prior to functional testing of the heat pipe. Additionally, the highest risk procedure, namely the fill tube pinch-off and manual (T.I.G.) seal welding is left as a final processing step. Numerous pipes fail irrepairably as a result of leak detection after this step alone.

SUMMARY OF THE INVENTION

The present invention provides an improved process and an apparatus to fabricate heat pipes to improve quality, reliability and productivity, for example.

The apparatus of the present invention comprises means for in-situ fabrication of the cleaned heat pipe casing to a completed heat pipe unit. With the automated heat pipe processing system, the heat pipe casing is subjected to glow-discharge cleaning, vacuum bakeout, if necessary; in-situ charging of the working fluid into the heat pipe casing and direct end cap sealing of the heat pipe casing within the sealed system.

Therefore, one object of the present invention is to provide a single heat pipe processing system to improve quality, reliability and reduce costs.

Another object of the present invention is to provide a single heat pipe processing system capable of computerized process control.

Another object of the present invention is to provide a single heat pipe processing system that cleans the open heat pipe casing, fills the heat pipe with the desired working fluid, and inertia seals the heat pipe totally within the system to prevent contamination.

Another object of the present invention is to provide a single heat pipe processing system that is capable of inputting many different working fluids into the heat pipe.

Another object of the present invention is to provide an automated joining technique of inertia welding to provide low contaminant, in-situ sealing of the heat pipe casing, maintaining a T6 temper in aluminum welds to reduce contaminants and time needed to seal the heat pipe.

These and many other objects and advantages of the present invention will be readily apparent to one skilled in the pertinent art from the following detailed description of a preferred embodiment of the invention and the related drawings.

DETAILED DESCRIPTION OF THE PREFERRED EMBODIMENT

Figure 1:
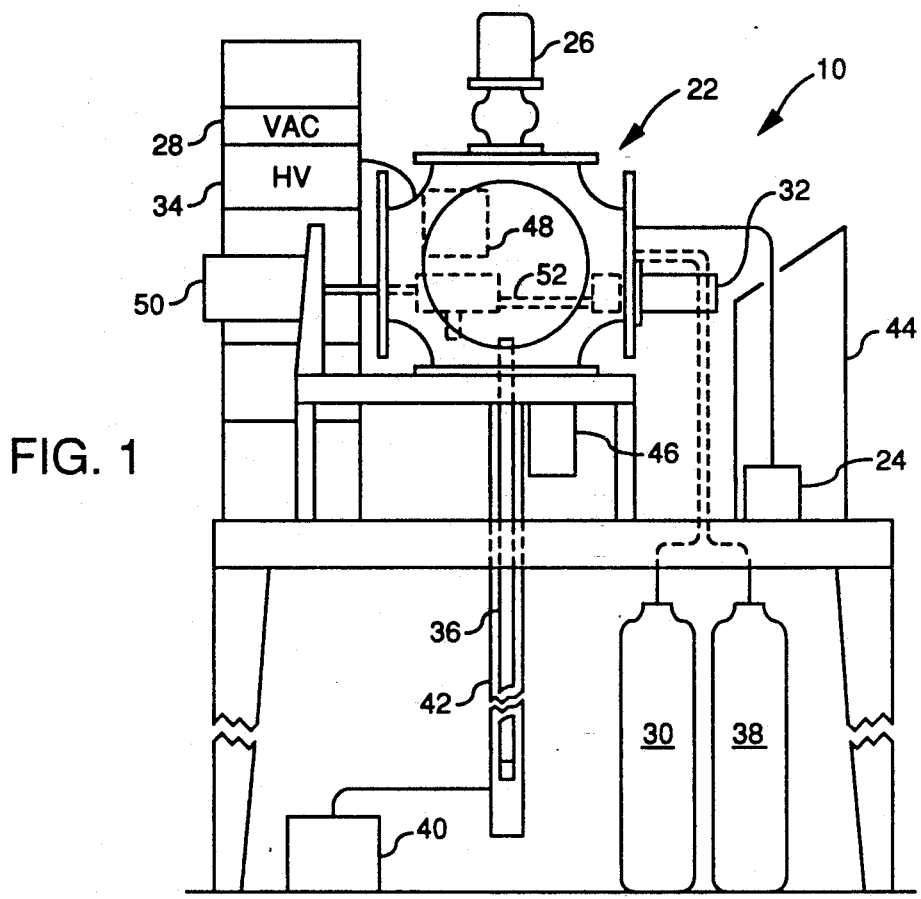
FIG. 1 illustrates schematically the heat pipe processing system of the present invention.

Referring to FIG. 1, an Automated Heat Pipe Processing System (AHPPS) 10 is shown schematically. The AHPPS 10 provides a single apparatus that provides for glow-discharge cleaning, vacuum bakeout, in-situ charging and direct end cap sealing within a single closed environment.

Figure 4:
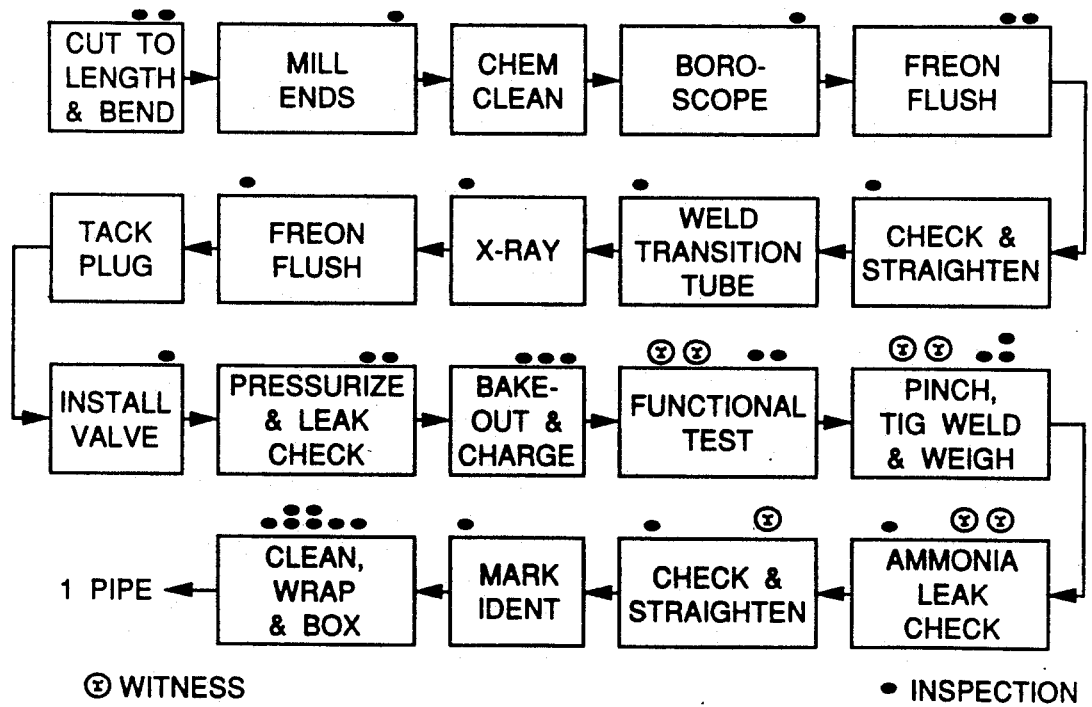
FIG. 4 illustrates the steps in fabricating a heat pipe by the prior method.

The prior process for fabricating a heat pipe is shown in FIG. 4. The conventional heat pipe fabrication process as shown in FIG. 4 relies upon a series of low productive steps requiring packaging and repackaging between individual work stations. Following solvent cleaning, the heat pipe casing is assembled with transition joint fill tubes and temporary valves via manual T.I.G. welding. Manual fusion welding is the primary means of assembly to provide leak tight, pressure vessel soundness. These steps account for up to 85% of in-processing failures, commonly requiring scrappage of the completed unit. In a series of high risk procedures, additional costs are incurred to prevent continued processing of defective hardware. As a result, 70% of the total fabrication cost has been expended prior to functional testing of the heat pipe. Additionally, the highest risk procedure, namely the fill tube pinch-off and manual T.I.G. seal welding is left as a final processing step. Numerous pipes fail irrepairably as a result of leak detection after this step alone.

Figure 6:
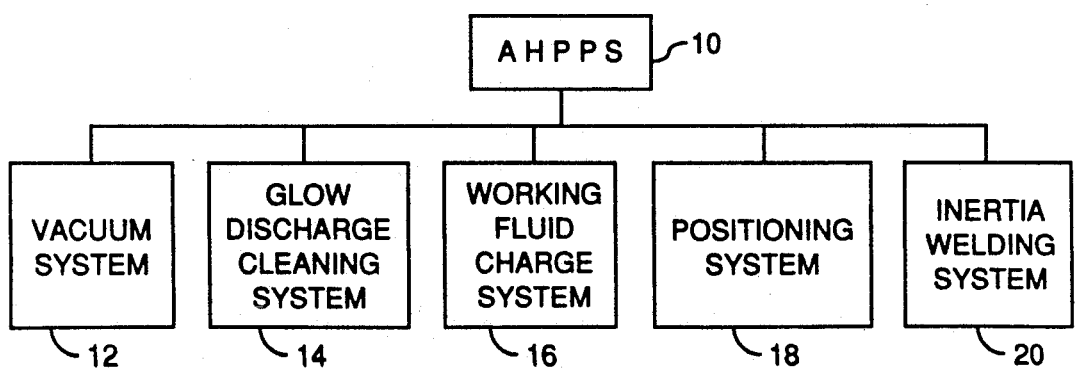
FIG. 6 illustrates the various systems in the automated heat pipe processing system of the present invention.

Referring to FIG. 6, the present invention being the AHPPS 10 is composed of the following systems to be further detailed hereinafter: a vacuum system 12, a glow-discharge system 14, a working fluid charging system 16, a positioning system 18, and an inertia welding system 20.

Figure 10:
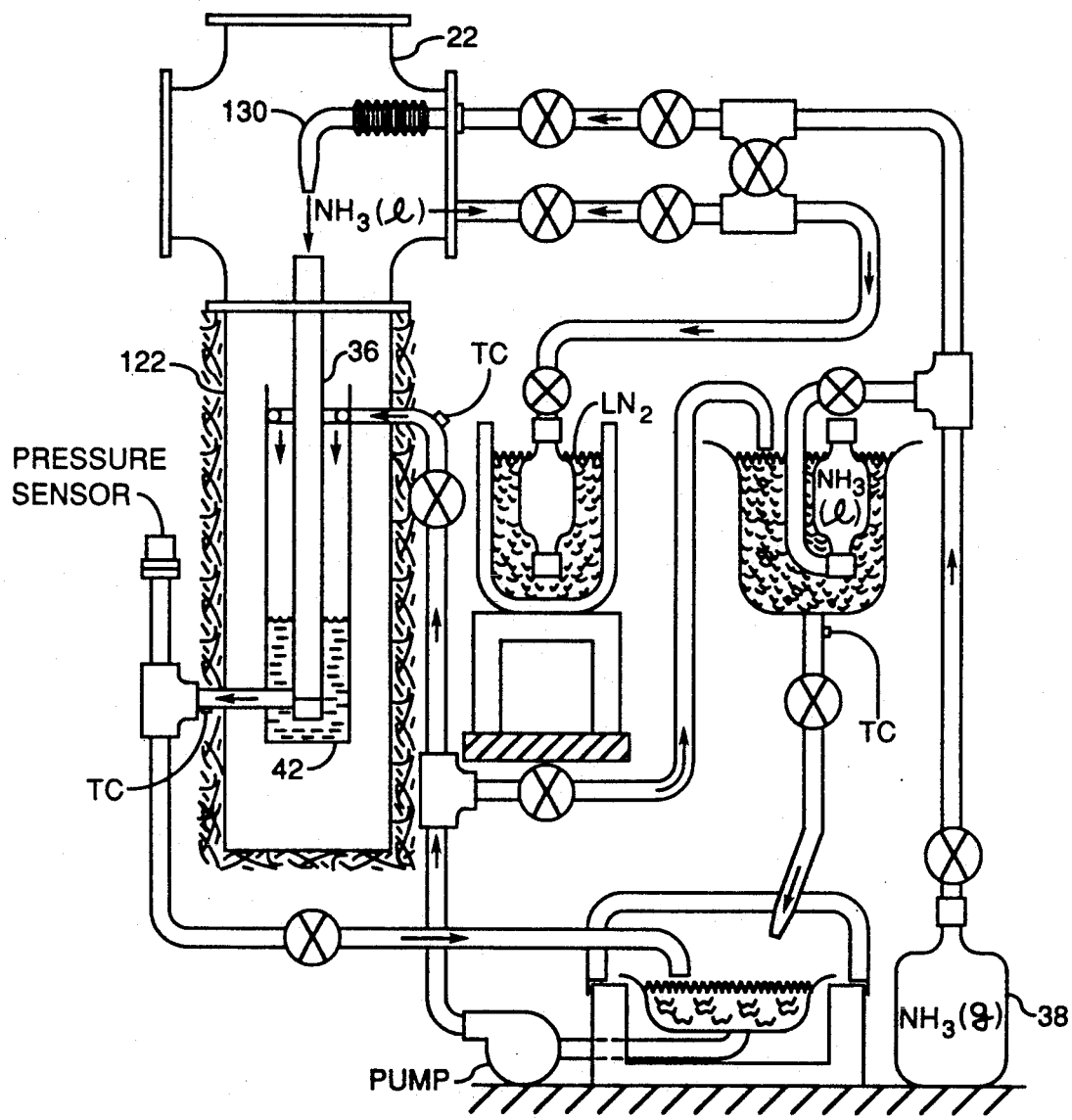
FIG. 10 illustrates the ammonia charging apparatus of the present invention.

Referring to FIG. 1, the vacuum system 12 comprises a vacuum chamber 22, a roughing pump 24, a cryopump 26 and a vacuum monitoring means 28. The glow-discharge system 14, FIG. 6, comprises a source of gas 30, carriage drives 32, the vacuum chamber 22, the cryopump 26, a high voltage supply 34 and a heat pipe casing 36 with a glow-discharge apparatus 37, FIG. 8. The working fluid charging system 16 comprises a source of fluid 38, a cold alcohol supply 40, a bath container 42, the heat pipe casing 36, the carriage drives 32, the vacuum chamber 22 and the cryopump 26, FIG. 10. The inertia welding system 20 comprises a control means 44, the heat pipe casing 36, an upset actuator 46, a welding device 48, (FIGS. 5 and 7 also), a traverse actuator 50 and travel ways 52.

FIG. 4 illustrates by fabrication steps the prior process of assembling a heat pipe. The problems of this process are noted above.

Figure 2:
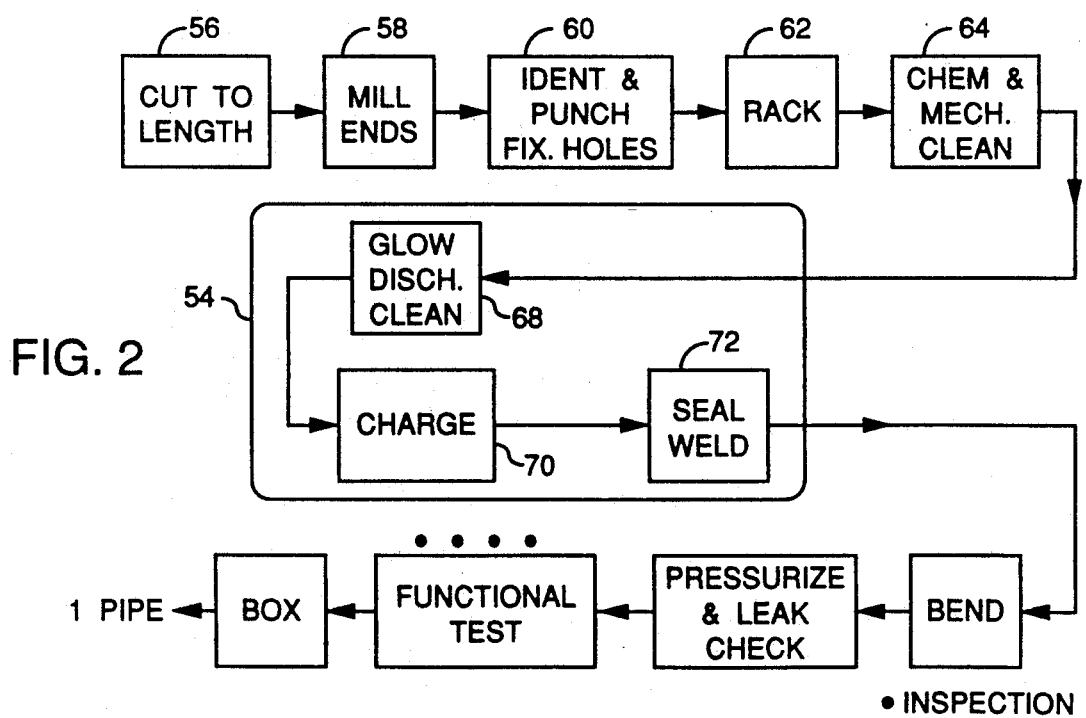
FIG. 2 illustrates the processing steps in fabricating a heat pipe by the present invention.

FIG. 2 illustrates the process steps of the present invention. The AHPPS 10 is now shown in a single step noted as 54.

Figure 7:
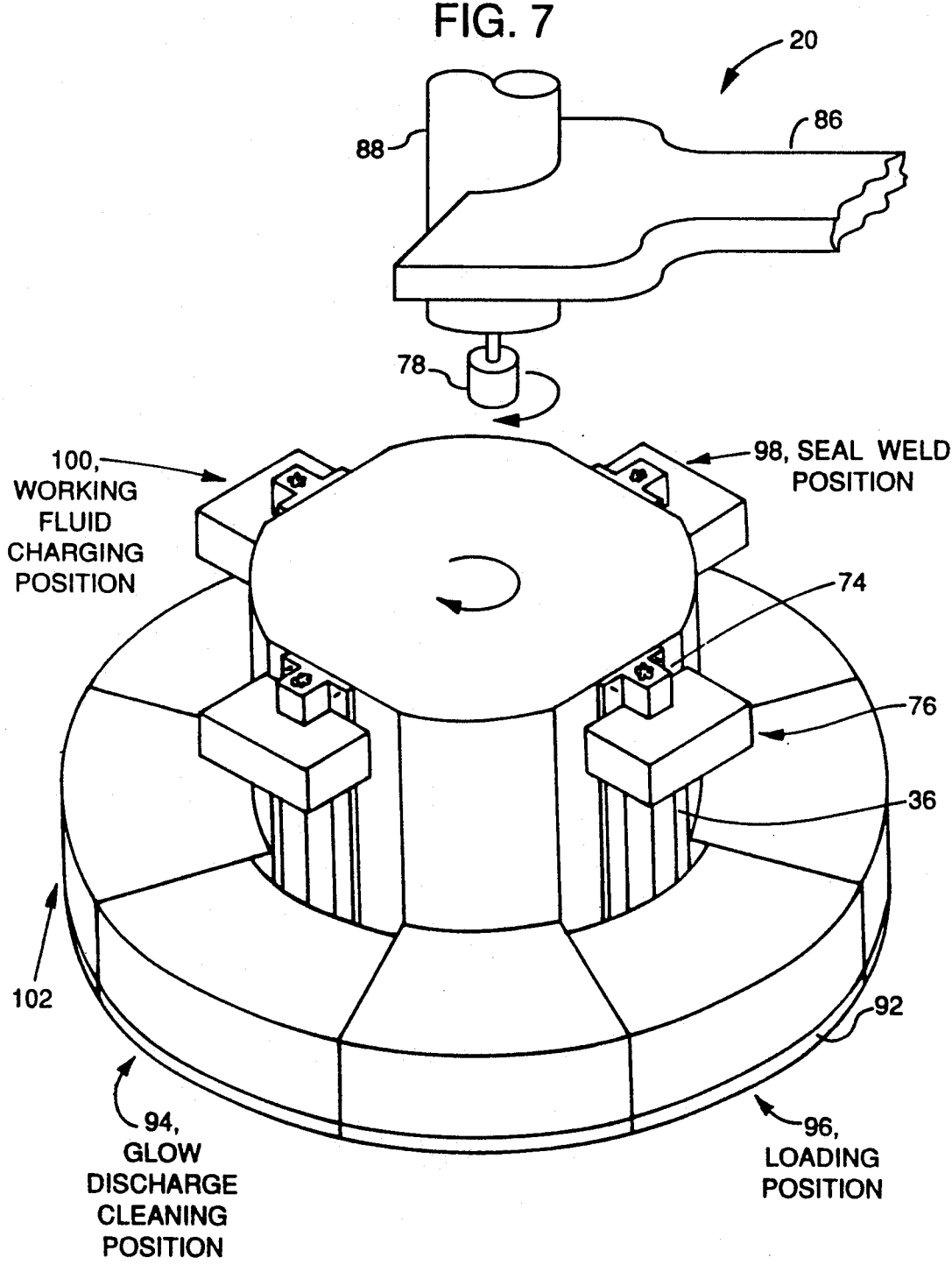
FIG. 7 illustrates partially a multiple heat pipe processing apparatus of the present invention.

Prior to placing the heat pipe 36 in the AHPPS 10, the steps 56 to 64 of FIG. 2 are performed. Although only a single heat pipe is fabricated by the present embodiment, the AHPPS 10 can be scaled up to be able to process multiple heat pipes by duplicating some of the apparatus shown in the FIG. 7. Referring to FIG. 7, a turret type carriage 102 is mounted in the bottom of the vacuum chamber 22 with a rotary seal 92 thereabout. The embodiment shown holds 4 heat pipe casings 36. The four positions, in order of movement, are the loading position 96, the glow-discharge cleaning position 94, the charging position 100 and the seal weld position 98.

Figure 5:
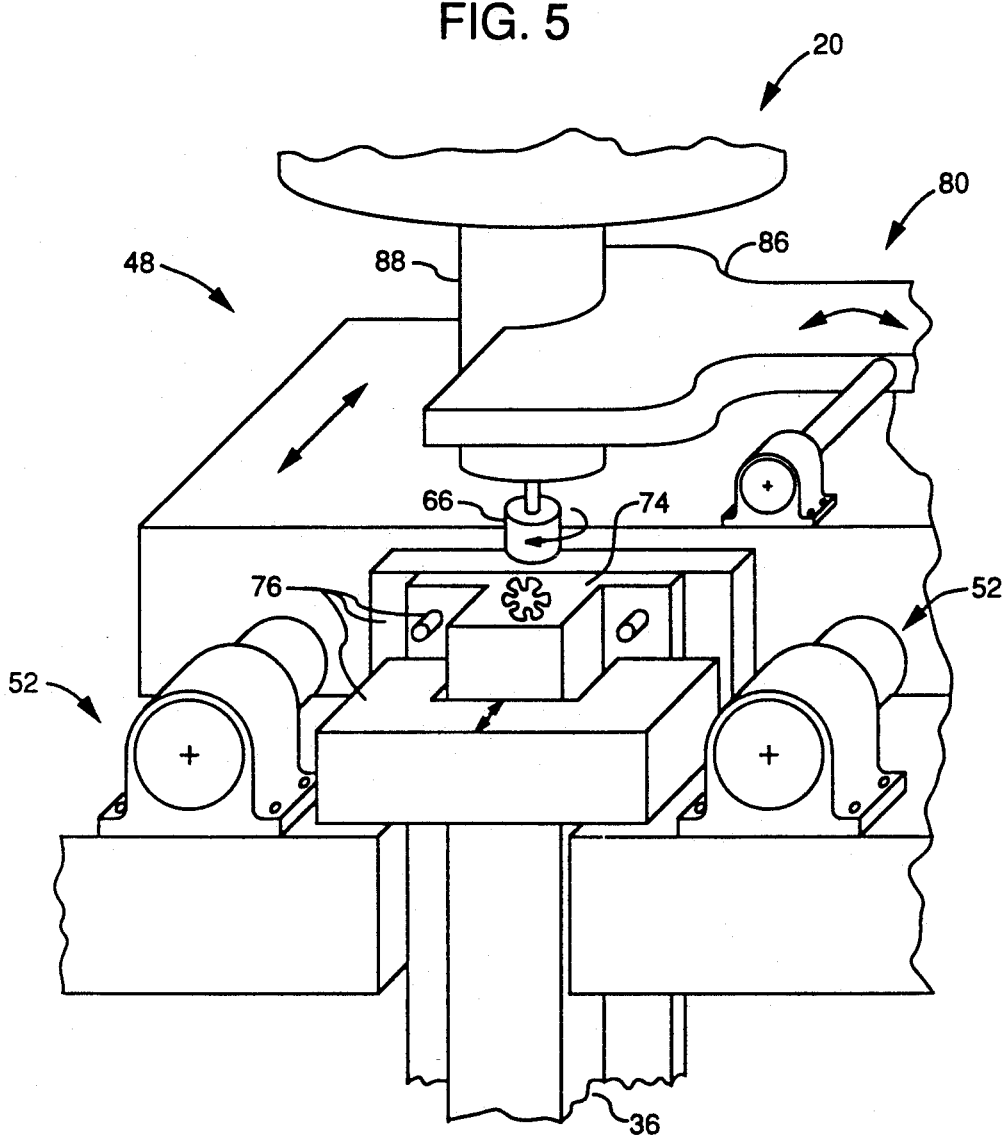
FIG. 5 illustrates by partial view the end cap inertia welding device of the present invention.

Prior to the ultracleaning, charging and sealing steps, chemical and mechanical cleaning of the heat pipe casing 36 occurs; the heat pipe casing 36 is then mounted inside the vacuum chamber 22 with an end cap 66, FIG. 5.

Figure 8:
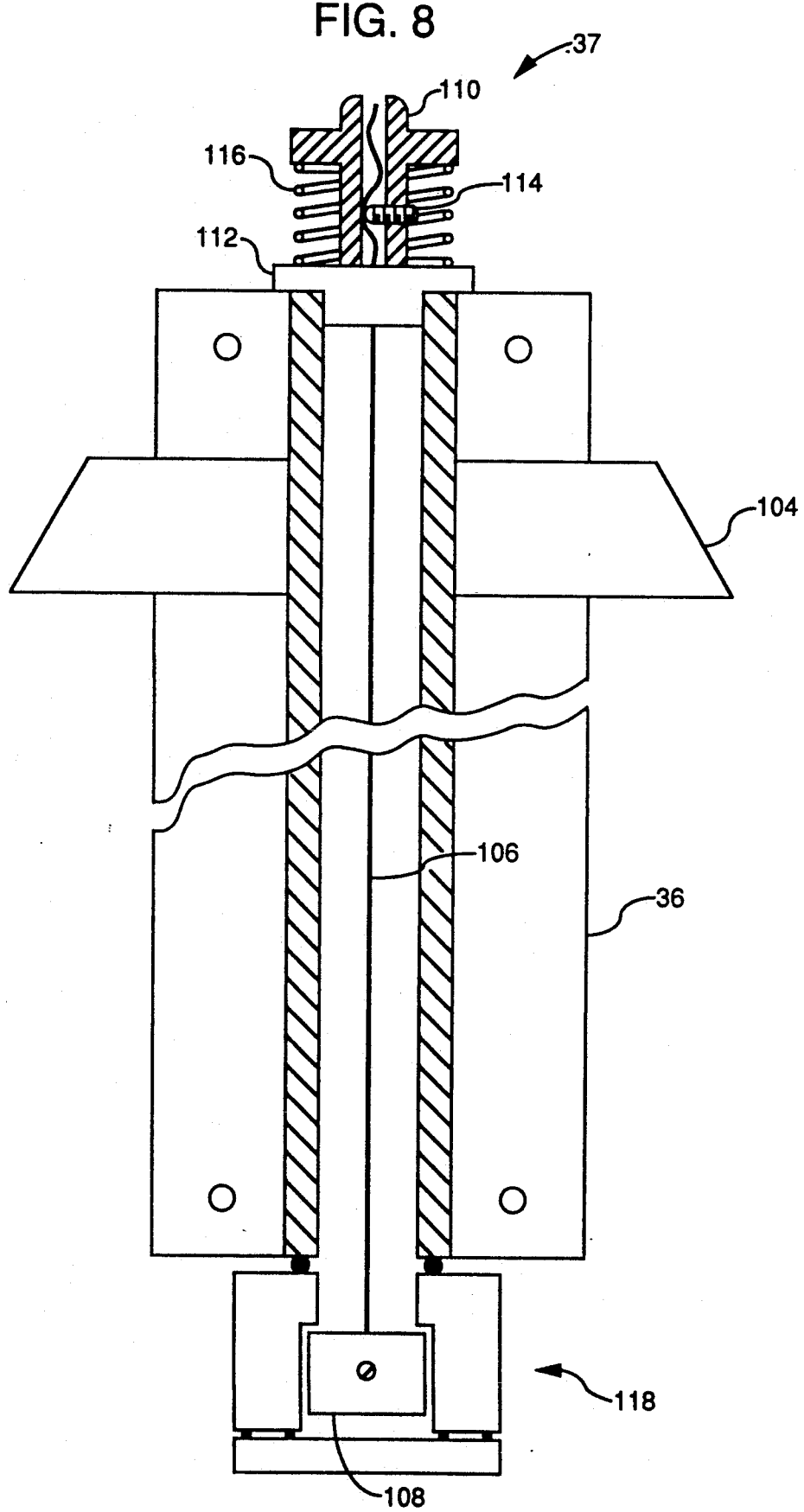
FIG. 8 illustrates the glow discharge cleaning apparatus of the present invention.

The roughing vacuum pump 24 and the cryopump 26 remove the ambient atmosphere from the vacuum chamber 22. At this point, the glow-discharge cleaning step 68 occurs. A gas such as argon or nitrogen is charged into the chamber 22 wherein a high voltage causes a plasma of such to be formed. Referring to FIG. 8, the glow-discharge apparatus 37 is shown inserted into a heat pipe casing 36 such as the ones shown in FIG. 7 except two end caps must be installed instead of one. As a result, the casing must be removed and inverted and the process repeated except no working fluid is input during the first process of capping the first end. A vacuum chamber seal 104 attaches to the vacuum chamber 22, not shown. An electrode wire 106 is held between a Teflon wire capture 108 and an electrical connector 110. A Teflon insulator 112 prevents grounding of the wire 106. The wire 106 is held in the connector 110 by a set screw 114 and a spring 116 maintains tension. The wire capture 108 is held in a chamber seal holder 118 which is sealed against the bottom of the heat pipe casing bottom.

In the event one end of the casing is already capped, the insulator may have an insulator rod affixed therein and extends downwards to an insulator spacer that maintains the rod spacing within the cavity of the casing. The high voltage wire can be placed about the insulator rod. This apparatus would be inserted and removed from the top of the casing from the top only without breaking the chamber seal.

This procedure affords direct exposure of all the fluid control surfaces to a glow discharge plasma (about 300 VDC) for ultra-cleaning of surface and near-surface contaminates. The total exposure times required are normally short, 10 to 15 minutes for aluminum surfaces without the requirement for extended heating of the heat pipe casing. This prevents the potential degradation of the mechanical and chemical properties of the casing.

Figure 9:
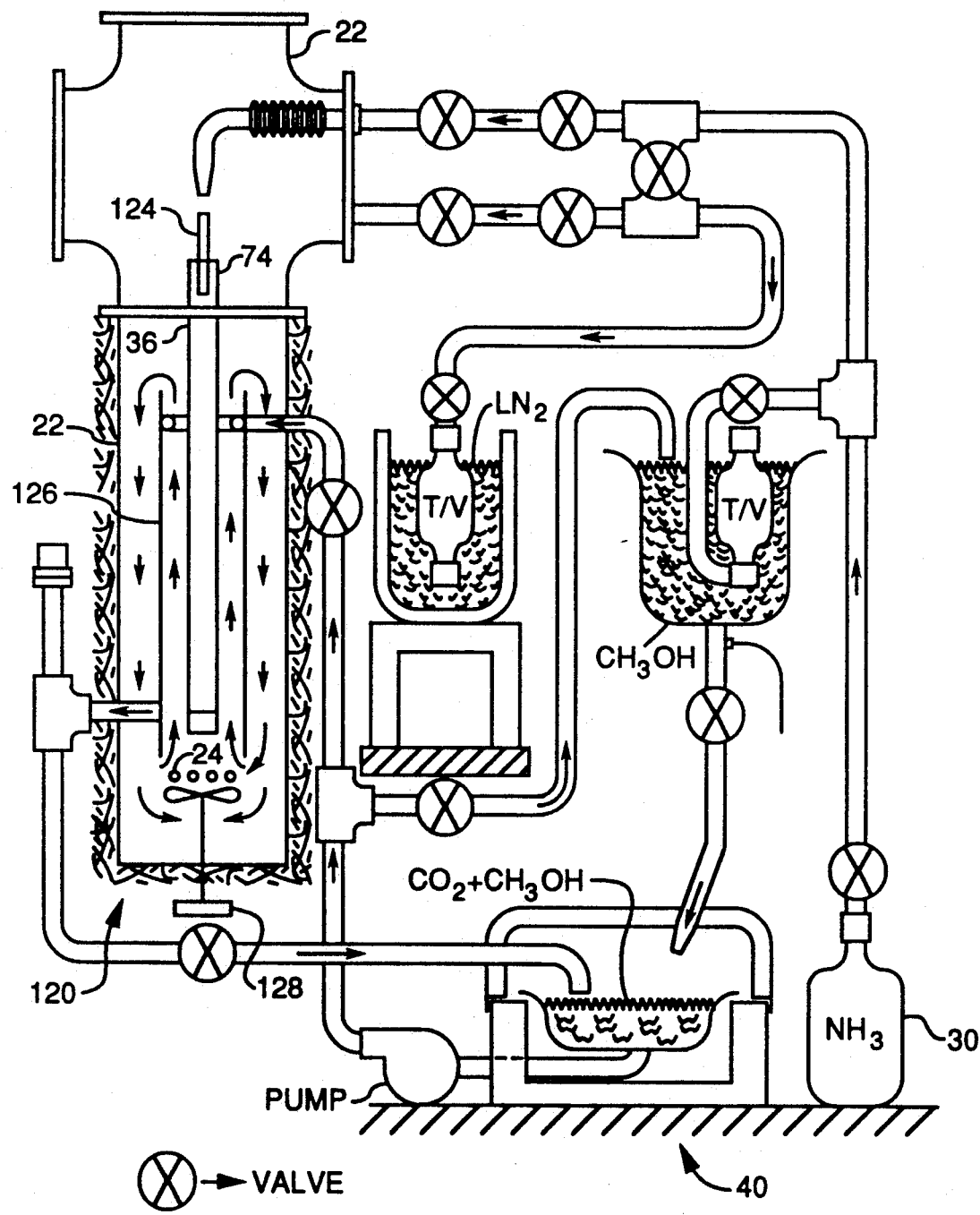
FIG. 9 illustrates the vacuum bakeout apparatus of the present invention.

The glow-discharge cleaning may substantially reduce or eliminate subsequent bakeout. An improved vacuum bakeout, if necessary, provides full vacuum exposures to the open internal cross-section of the heat pipe casing for maximum molecular conductance. Maximum vacuum pumping efficiency is obtained with maximum open exposed areas without bends, fill tubes or valves. FIG. 9 illustrates the vacuum bakeout apparatus 120 as would be incorporated in the AHPPS 10 of FIG. 1, if necessary. As seen therein, an outer container 122 is placed about the section of the heat pipe casing 36 extending out of the chamber 22. A plurality of resistive heating rods 124 are placed about the heat pipe casing 36. An inner wall 126 about the heat pipe casing 36 provides a path for the heated gas to be moved by a fan-motor 128.

Conventional processing can only expose the internal surfaces to vacuum environments through restrictive fill tubes and valves, limiting the actual, vacuum conductance to some degraded value. Additionally, this improved procedure provides for intimate exposure of the upper heat pipe internals to the direct radiant heating of a Calrod. The lower section of the casing, being external to the chamber 22, is heated conventionally such that a uniform temperature distribution throughout the casing is maintained.

The in-situ fluid charging procedure, step 70, follows directly after the glow-discharge procedure, step 68, within the same chamber 22. See FIG. 10. The heat pipe casing 36, external to the chamber 22, is cooled by a liquid bath of cold alcohol 42, for example, with the liquid level and the vapor pressure of the chamber 22 controlled to maintain the required amount of charge liquid 38 within the heat pipe casing 36. The charge liquid is pre-cooled before entering the chamber 22 to reduce its vapor pressure to a level such that the expansion into the chamber 22 will not freeze the liquid in the filler tube 130. No movement of the metal heat pipe is required in this step. This direct liquid fill of the heat pipe casing eliminates time consuming cryopumping of the liquid/vapor into the heat pipe. This process eliminates all fill tubes and valves attached to the casing. The heat pipes are filled directly and then sealed.

Liquid metal heat pipes may also be readily charged in the chamber 22 by maintaining a noble gas environment in the vessel while charging with the working fluid. This is followed by pulling the chamber 22 to a hard vacuum just prior to final closure seal welding procedure.

Variable conductance heat pipes may also be charged using this automated system. After the working fluid is charged in the casing, the chamber atmosphere is modified to include a non-condensable gas at the required pressure prior to final seal welding.

Figure 3:
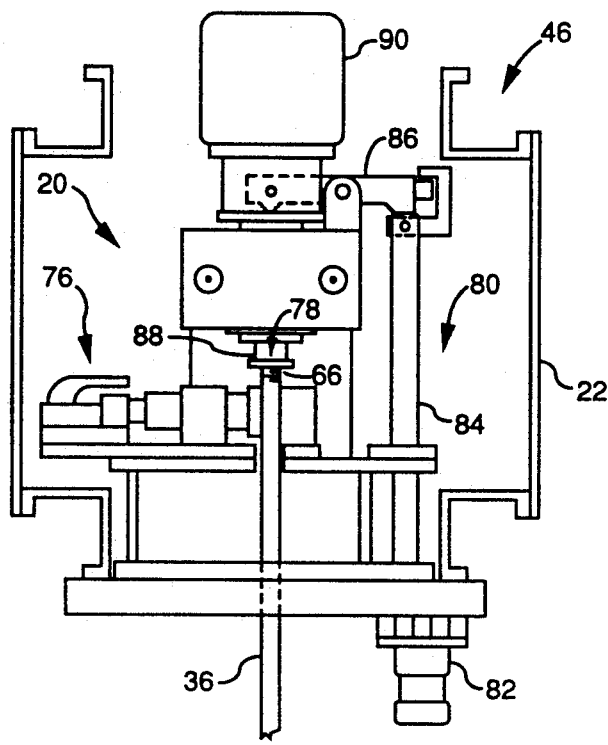
FIG. 3 illustrates the end cap sealing device with the vacuum chamber of the present invention.

The final chamber procedure, step 72, is end cap seal welding via an inertia welding system 20, FIG. 3. This is designed specifically to operate with the chamber 22 under vacuum and fluid vapor environments. The automated weld procedure, lasting about 3 seconds, will produce waterclear (pore free) welds without the introduction of secondary filler materials with their attendant contamination problems. The resultant seal weld creates a slag free cross-section slightly larger than the original weld prep and maintains parent metal strength throughout the weld.

After the filler tube 130 is moved out of the way, the inertia welding system 20 is positioned over the upper end 74 of the heat pipe casing 36, FIG. 5, by use of the carriage drives 32 and the traverse actuator 50 which moves the system 20 upon the travel ways 52.

Referring to FIG. 3, the inertia welding system 20 comprises, in general, a heat pipe casing holding apparatus 76, an end cap holding apparatus 78 and a thrusting apparatus 80. Therein, a hydraulic ram 82 is connected to a piston 84 that pushes on a hinged lever 86. The hinged lever 86 causes a chuck and spindle 88 to push the end cap 66 onto the end 74 of the heat pipe casing 36. An electric motor 90 spins the chuck and spindle 88 at a desired speed prior to engagement of the end cap and the heat pipe casing.

In order to operate the AHPPS 10 in the automated mode, the following command sequences would be required. See Table 1. Each system command is a system component which has been designed for electronic controls such as solenoid valves, power supplies, stepping motors for controlled movement, relays, microswitches, vacuum pumps, meters, etc.

TABLE 1

COMPUTER COMMANDS

| System Command | Chamber Condition | Command Action |
|---|---|---|
| Subroutine 100 Vacuum | Shut valves | Rough pump to $10^{-3}$ Torr Shut rough/open gate valves Hi-Vac pump to $10^{-5}$ Torr Shut gate valve |
| Subroutine 200 Glow Discharge Cleaning | | $N_2$ backfill to 200 microns Turn power supply on Ramp voltage to 400 V. Profile volt. to nor. state Operation for prog. time Turn power supply off Disengage wire holder Retract wire onto carriage |
| Subroutine 300 Working Fluid Charge | Filling tube position Chiller on | Open fill valve Wait for ultrasonic signal Close fill valve Return carriage to home position |
| Subroutine 400 Inertia Welding | Weld machine on | Position welder over HP Actuate weld cycle Return welder to home position |
| Subroutine 500 Repeat sequences for other heat pipes in chamber | | |

This single chamber process provides for a simplified, integrated and effective fabrication of heat pipes which improves quality and reliability over the conventional processing while having an order-of-magnitude impact on reducing costs.

This system design approach utilizing a single chamber to clean, charge, and seal the heat pipe casings eliminated extraneous components, procedures, risks and costs.

This chamber processing is capable of complete computerized process control, tracking, and individual unit processing date accumulation.

This system provides for batch processing, in any convenient size batch, to maximize productivity and minimize costs.

This system provides charging the working fluid(s) within the same chamber used to clean and seal, without movement to a separate workstation. Additionally, charging is done in-situ, directly into the heat pipe casing without the requirement for fill tubes and valves or cryopumping. A vacuum pressure of less than $10^{-5}$ Torr is required to assure low non-condensable gas concentration prior to ammonia charging.

This system provides for sterile seal inertia welding of end caps, within a single chamber, directly following the charging procedure. This maintains cleanliness of the article without the possibility of introducing airborn contaminates or foreign materials.

This system provides for the dual ultra-cleaning procedure of glow-discharge and vacuum bakeout while the heat pipe casing is in the open ended, unsealed condition. This direct exposure of the critical heat transfer surfaces to the discharge plasma and the internally installed radiant heaters affords maximum molecular conductance to achieve the best surface and near surface contamination removal, without affecting the temper of the casing.

This system affords the capability to manufacture heat transfer devices of many working fluids, i.e, $NH_3$, Acetone, Propane, Freon, Methanol, Ethane, Oxygen, MEK, $H_2O$, Na, K, NAK, etc.

This system affords direct, high precision, in-situ charging of the working fluid without foreign weld materials contamination. The inertia welding process makes an autogenous weld, utilizing only the casing and the end cap material directly. Parent metal strength of the casing/end cap material is maintained utilizing the inertia welding process.

Contamination is reduced to ultra low levels due to elimination of chamber contaminants, the sterile heat pipe casing, and the fact that no secondary weld materials are brought into the chamber to perform the inertia seal welding.

The inertia welding of end caps within the processing chamber affords a rapid (3 seconds), single step, low cost procedure. This can be done in one of two fashions: (1) both ends subsequent to glow discharge cleaning, or (2) one end prior and one end subsequent to glow discharge cleaning. In the first fashion both end caps are welded subsequent to discharge cleaning the second end cap following fluid charging. The alternate approach welds one end cap on prior to glow discharge cleaning (in an ambient air environment). The final end cap seal weld is made in-situ immediately following liquid charging. This approach requires remotely removable discharge tooling and provides for continuously controlled gas pressure environments which prevent readsorption of oxygen and water vapor on the glow discharge cleaned surfaces.

Clearly, many modifications and variations of the present invention are possible in light of the above teachings and it is therefore understood, that within the inventive scope of the inventive concept, the invention may be practiced otherwise than specifically claimed.

What is claimed is:

1. An automated heat pipe processing system, said system having input at least one heat pipe casing and at least one end cap for such, said automated heat pipe processing system comprising:
   a vacuum chamber;
   a means for causing a vacuum in said vacuum chamber;
   a means for causing a glow discharge cleaning in said vacuum chamber, said glow discharge cleaning means providing an ultra-clean surface;
   a means for inputting a working fluid into the heat pipe casing;
   a means for positioning the heat pipe casing for inputting the working fluid; and a means for inertia welding, said inertia welding means fixedly attaching end caps onto the heat pipe casing.

2. An automated heat pipe processing system as defined in claim 1 further including means for processing multiple heat pipe casings.

3. An automated heat pipe processing system as defined in claim 1 further including a means for bakeout of the heat pipe casing.

4. An automated heat pipe processing system as defined in claim 1 wherein said glow discharge cleaning means uses argon or nitrogen.

5. An automated heat pipe processing system as defined in claim 1 wherein said working fluid is selected from the group consisting of $NH_3$, Acetone, Propane, Freon, Methanol, Ethane, Oxygen, Methyl Ethyl Ketone, $H_2O$, Na, K and a Sodium/Potassium mixture.

6. An automated heat pipe processing system as defined in claim 1 wherein said heat pipe casing is rectangularly shaped.

7. An automated heat pipe processing system as defined in claim 2 wherein said means for positioning includes a turret holding means wherein a plurality of heat pipe casings are mounted therein and said turret positions each heat pipe in a desired position.

8. An automated heat pipe processing system as defined in claim 6 further including said casing having mounting flanges fixedly attached thereon.

9. An automated heat pipe processing system as defined in claim 1 wherein said means for glow discharge cleaning has means therein for positioning a high voltage wire into a void of said heat pipe casing.

10. A process of fabricating heat pipes in an automated heat pipe processing system, said process comprising the steps of:

mounting at least one heat pipe casing within a container attached to vacuum chamber;

mounting at least one end cap for at least one heat pipe onto an inertia welding system within the chamber;

vacuum sealing the automated heat pipe processing system;

causing a vacuum to be formed within the vacuum chamber;

cleaning the heat pipe casing within the vacuum chamber;

inputting a working fluid into the heat pipe casing;

positioning the at least one heat pipe casing within the inertia welding system for receiving the at least one end cap;

inertia welding the at least one end cap to the at least one heat pipe casing to form a heat pipe; and removing the heat pipe from the automated heat pipe processing system.

11. A process as defined in claim 10 wherein said cleaning includes a step of glow discharge cleaning of the heat pipe casing.

12. A process as defined in claim 11 further including a step of heat bakeout.

13. A process as defined in claim 10 wherein said steps are repeated for each heat pipe casing within the automated heat pipe processing system.

14. A process as defined in claim 13 wherein a plurality of heat pipe casings are mounted in a rotating turret holding means.

15. A process as defined in claim 10 wherein the at least one heat pipe casing requires caps on both ends, a first cap being inertia welded thereon with the exception of the working fluid charging, said heat pipe casing being removed from the vacuum chamber, inverted, and processed as in claim 10.

* * * * *